United States Patent
Meier et al.

(10) Patent No.: US 7,426,289 B2
(45) Date of Patent: Sep. 16, 2008

(54) OVERLAY OF TINTED IMAGES FOR VISUALIZING CHANGE IN SERIAL RADIOLOGIC IMAGES

(75) Inventors: Dominik Meier, Brookline, MA (US); Charles R. G. Guttmann, Brookline, MA (US)

(73) Assignee: The Brigham and Women's Hospital, Inc., Boston, MA (US)

( * ) Notice: Subject to any disclaimer, the term of this patent is extended or adjusted under 35 U.S.C. 154(b) by 393 days.

(21) Appl. No.: 10/966,588

(22) Filed: Oct. 14, 2004

(65) Prior Publication Data

US 2006/0083424 A1      Apr. 20, 2006

(51) Int. Cl.
*G06K 9/00*      (2006.01)
(52) U.S. Cl. ............... 382/128; 382/130; 382/132; 382/162; 382/165
(58) Field of Classification Search ............... 382/128, 382/130, 131, 132, 162, 165, 284, 294
See application file for complete search history.

(56) References Cited

U.S. PATENT DOCUMENTS

| | | | |
|---|---|---|---|
| 6,580,936 B2 | 6/2003 | Muraki et al. | |
| 6,901,280 B2 * | 5/2005 | Pelletier et al. | 600/410 |
| 6,909,792 B1 * | 6/2005 | Carrott et al. | 382/128 |
| 7,200,252 B2 * | 4/2007 | Douglass | 382/128 |
| 2007/0053554 A1 * | 3/2007 | Fayad et al. | 382/128 |

OTHER PUBLICATIONS

Frederick Kelcz et al. "Clinical Testing of High-Spartial-Resolution Parametric Contrast-Enhanced MR Imaging of the Breast" American Journal of Roentgenology, 19 pages.
W. Eugene Phillips II, et al., "Neuroradiologic MR Applications With Multiparametric Color Composite Display", magnetic Resonance Imaging, vol. 14, No. 1, pp. 59-72, 1996, pp. 59-72.
David R. Manka et al., "Noninvasive In Vivo Magnetic Resonance Imaging of Injury-Induced Neointima Formation in the Carotid Artery of the Apolipoprotein-E Null Mouse" Journal of Magnetic Resonance Imaging 12:790-794 (2000), pp. 790-794.
Bruno Alfano et al., "Simultaneous display of multiple MR parameters with 'quantitative magnetic color imaging'", Journal of Computer Assisted Tomography, vol. 16, No. 1, 1992, pp. 634-640.
H. Keith Brown et al. "Generation of Color Composites for Enhanced Tissue Differentiation in Magnetic Resonance Imaging of the Brain", American Journal of Anatomy, Sep. 1991, vol. 192, No. 1, pp. 23-34.
Francesco Beltrame et al. "Recent results in color compositing of three-parameter magnetic resonance scans as a preoperative aid to the management of upper limb sarcomas", Magnetic Resonance materials in Physics, Biology, and Medicine; Magma 5, 1997, pp. 289-298.

(Continued)

*Primary Examiner*—Bhavesh Mehta
*Assistant Examiner*—John B Strege
(74) *Attorney, Agent, or Firm*—Fish & Richardson P.C.

(57) ABSTRACT

A method for combining serial radiological images includes the projection of each of the images onto a line in a color space, the evaluation of a vector sum of the resulting projections; and the generation of a composite image from the vector sum.

14 Claims, 5 Drawing Sheets
(2 of 5 Drawing Sheet(s) Filed in Color)

OTHER PUBLICATIONS

Takeshi Maeda et al. "Standardized Multicolored Magnetic Resonance Images of Gynecologic Lesions", Osaka City Medical Journal, 2001, vol. 47, No. 1, pp. 73-82.

Y. Suto et al. "Clinical Trial of Color-Hybrid Images for Assessment of Gd-DTPA Contrast Enhancement" Nippon Igaku Hoshasen Gakkai Zasshi 51, 1991 pp. 1240-1246.

* cited by examiner

OVERLAY OF TINTED IMAGES FOR VISUALIZING CHANGE IN SERIAL RADIOLOGIC IMAGES

FIELD OF INVENTION

This invention relates to medical imaging, and in particular, to image interpretation.

BACKGROUND

Certain illnesses are made manifest by changes in the morphology of some internal structure in the body. These structures, and many others, can be viewed using any of a variety of radiological techniques.

The images that result from any of those radiological techniques are snapshots frozen in time. To identify a change in the morphology, one visually inspects two or more images of the same region of the body. While this procedure is suitable for identifying gross changes in morphology, it is easy to miss more subtle changes.

For example, FIG. 1 shows three successive MRI images representing longitudinal cross-sections of a brain taken some months apart. A close inspection of these images reveals numerous changes in brain morphology. However, these changes are subtle and easily overlooked, even by those trained in the appropriate specialty.

SUMMARY

The invention is based on the recognition that vector addition in a color space can be used to draw attention to subtle changes in a sequence of images. In particular, the invention draws attention to changes in a sequence of images by tinting each image with a particular color. When the images are spatially registered and overlaid, colors assigned to corresponding pixels will add in such a way that static portions of the resulting image will appear in the same color (grayscale, black & white), and changing portions of the resulting image will appear in other colors.

In one aspect, the invention includes a method for drawing attention to changed regions in serial radiological images. The method includes tinting each of the images with a different color, spatially registering the images, and overlaying the images so that static regions and changed regions are distinguishable from each other by color.

Additional practices of the invention include those in which tinting each of the images with a different color includes selecting the different colors to define an orthogonal basis of a color space. For example, this may include tinting a first image blue, tinting a second image green, and tinting a third image red. In one practice of the invention, the first image is selected to be an image obtained before the second image, and the second image is selected to be an image obtained before the third image.

Other practices of the invention include those in which the images are normalized relative to each other.

Another aspect of the invention includes a method for combining serial radiological images. The method includes the projection of each of the images onto a line in a color space, the evaluation of a vector sum of the resulting projections; and the generation of a composite image from the vector sum.

Alternative practices of the invention include those in which projecting each of the images onto a line in a color space includes selecting the lines on which the images are projected to include axes of an orthogonal basis for the color space. For example, the axes can be selected to include a red axis, a green axis, and a blue axis.

The temporal significances of the axes is arbitrary. However, in one practice of the invention, the image acquired most recently is projected onto the red axis, and the earliest-acquired image is projected onto the blue axis.

Another practice of the invention features the additional step of normalizing the images relative to each other.

The particular type of image can be an MRI image. However, other types of radiological images, such as computerized tomography ("CT") or ultrasound ("US") images can also be used.

In another aspect, the invention includes a computer-readable medium having encoded thereon software having instructions for carrying out any of the foregoing methods.

In yet another aspect, the invention includes a system for processing MRI images. The system includes a data storage medium for storing serial MRI images, a processor configured to process the MRI images to draw attention to changed regions therein, and a computer-readable medium in data communication with the processor. The computer-readable medium has, encoded thereon, software having instructions for executing any of the foregoing methods.

Other features and advantages of the invention will be apparent from the following detailed description, and from the claims.

BRIEF DESCRIPTION OF THE DRAWINGS

This patent of application file contains at least one drawing executed in color. Copies of this patent or patent application publication with color drawing(s) will be provided by the Office upon request and payment of the necessary fee.

DETAILED DESCRIPTION

Figure 1:
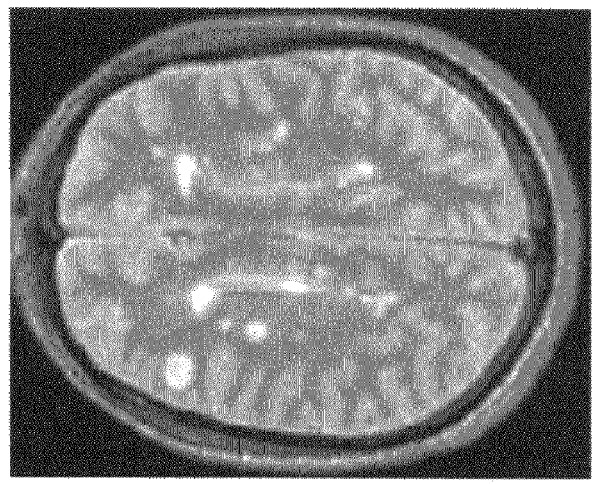
FIG. 1 shows three serial MRI images of the same longitudinal section of a brain separated by several months.
Figure 1:
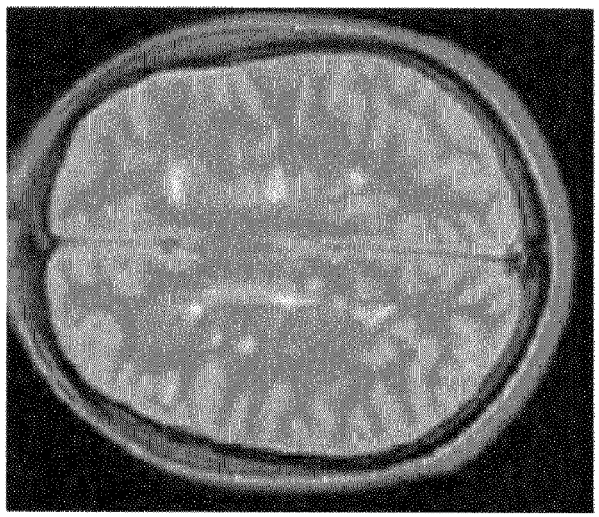
Figure 1:
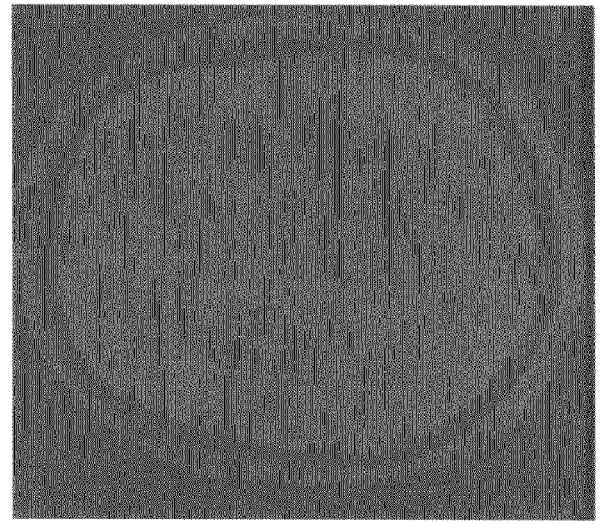
Figure 2:
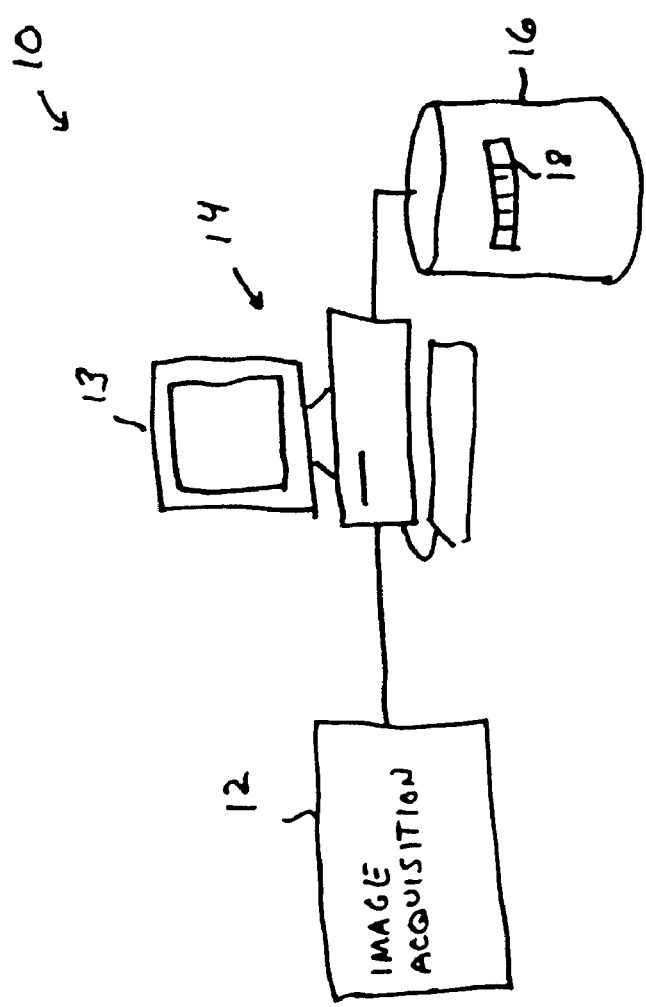
FIG. 2 shows an image acquisition system.

FIG. 2 shows an imaging system 10 having an image acquisition device 12 in data communication with a general purpose digital computer 14 having a mass storage device 16 and a display 13. A variety of image acquisition devices 12 can be used in connection with FIG. 2. Exemplary image acquisition devices 12 include MRI devices, including devices for obtaining functional MRI images, ultrasonic imaging devices, CAT scanners, and PET scanners. Moreover, the image acquisition device 12 need not be one that acquires images of internal structures. For example, a digital camera might be used to take sequential images of skin tissue in an effort to identify changes in skin pigmentation that may be indicative of melanoma.

Figure 3:
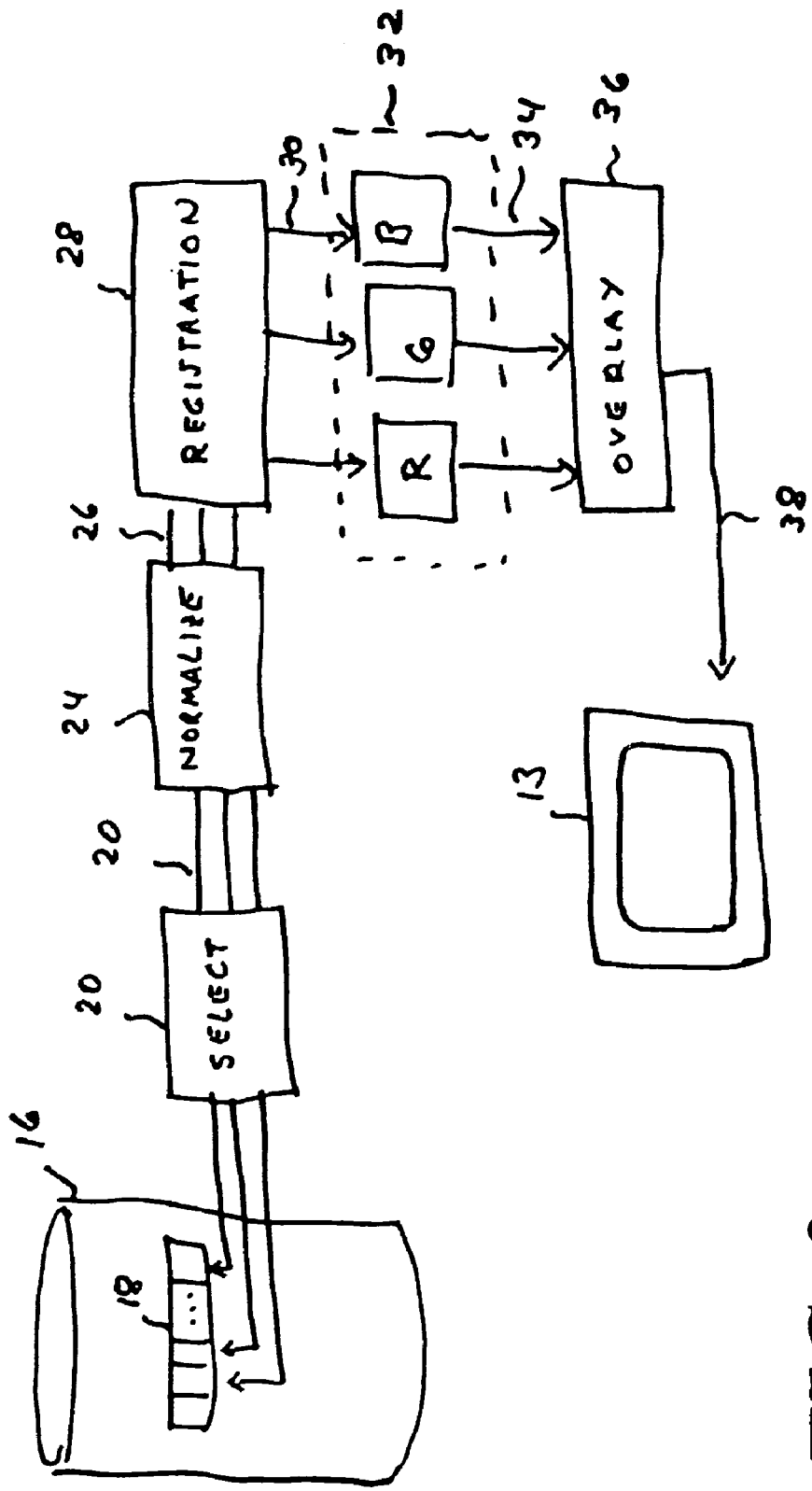
FIG. 3 shows architecture software used to overlay images using the computer shown in FIG. 2.

Serial images 18 acquired by the image acquisition device 12 are stored on the mass storage device 16 for further processing, as shown in FIG. 3. These serial images 18 are obtained with identical acquisition parameters. They differ only in the times at which they were obtained.

The data stored on a mass storage device 16 is in fact data representative of the serial images 18 and not the images themselves. Nevertheless, throughout this specification, the term "image" will be used to refer also to the data representative of that image.

As shown in FIG. 3, which depicts the architecture of an image processing system, a user provides a selection process 20 with instructions on which of the serial images 18 are to be compared. Because the color space is inherently three dimensional, images are best compared three at a time. However, the selection process 20 can select two or more images for comparison.

Each pixel in a serial image 18 represents a measured physical parameter. However, the serial images were taken at different times, and possibly using different image acquisition devices 12. As a result, there may have been differences in performance and calibration of the image acquisition device 12. These differences may result in pixels on one serial image 18 appearing different from pixels in another image even though both represent the same underlying physical parameter.

Accordingly, in response to the user's selection of serial images 18 to be compared, the selection process 20 retrieves selected images 22 from the mass storage device 16 and provides them to a normalizing process 24. The normalizing process 24 then generates three normalized images 26 from the three selected images 22.

Again, because the serial images 18 were taken at different times, there is no guarantee that the patient's position was identical each time. The normalized images 26 may therefore be spatially misaligned. In particular, the image coordinates of a structure in one normalized image 26 may not match the image coordinates of that structure in another image. To avoid this, the normalized images 26 are provided to a registration process 28 that aligns the image coordinate systems associated with each normalized image 26. The resulting aligned images 30 have the property that the image coordinates associated with a particular structure are the same across all the aligned images 30.

Each of the three aligned images 30 is then provided to a tinting process 32 to be tinted with one of three colors. Exemplary tinted images 34 are shown on the left side of FIG. 4. Preferably, the aligned images 30 are tinted in red, blue, and green because those colors form an orthogonal basis for the RGB color space used in conventional computer monitors. The resulting tinted images 34 are then provided to an overlay process 36.

Each pixel on an aligned image 30 is typically a shade of gray, with white and black being considered limiting cases of gray. Accordingly, each pixel can be viewed as being mapped to a point on a line in the RGB color space, the line being characterized by equal contributions of red, green, and blue. The process of tinting an aligned image 30 effectively projects this line onto one of the three orthogonal axes of the color space.

The effect of tinting is that if a pixel in one tinted image 34 is identical to its corresponding pixels in the remaining two tinted images 34, a vector sum of the color vectors associated with each of those pixels will result in the original shade of gray that was common to all three aligned images 30. On the other hand, if a pixel in a tinted image 34 differs from its corresponding pixels in one or both of the other two tinted images 34, the vector sum of the color vectors associated with the three pixels will result in a color, the particular color being dependent on the nature of that difference.

For each pixel location in a tinted image 34, the overlay process 36 performs a vector sum in the RGB color space of the pixels in each of the three tinted images 34 that correspond to that location. This results in a color-composite image 38 in which regions that are gray correspond to regions that remained the same across all three images, and regions that are colored correspond to regions that changed in at least one of the three images. The particular color that results from the vector addition is indicative of when the change occurred.

Figure 4:
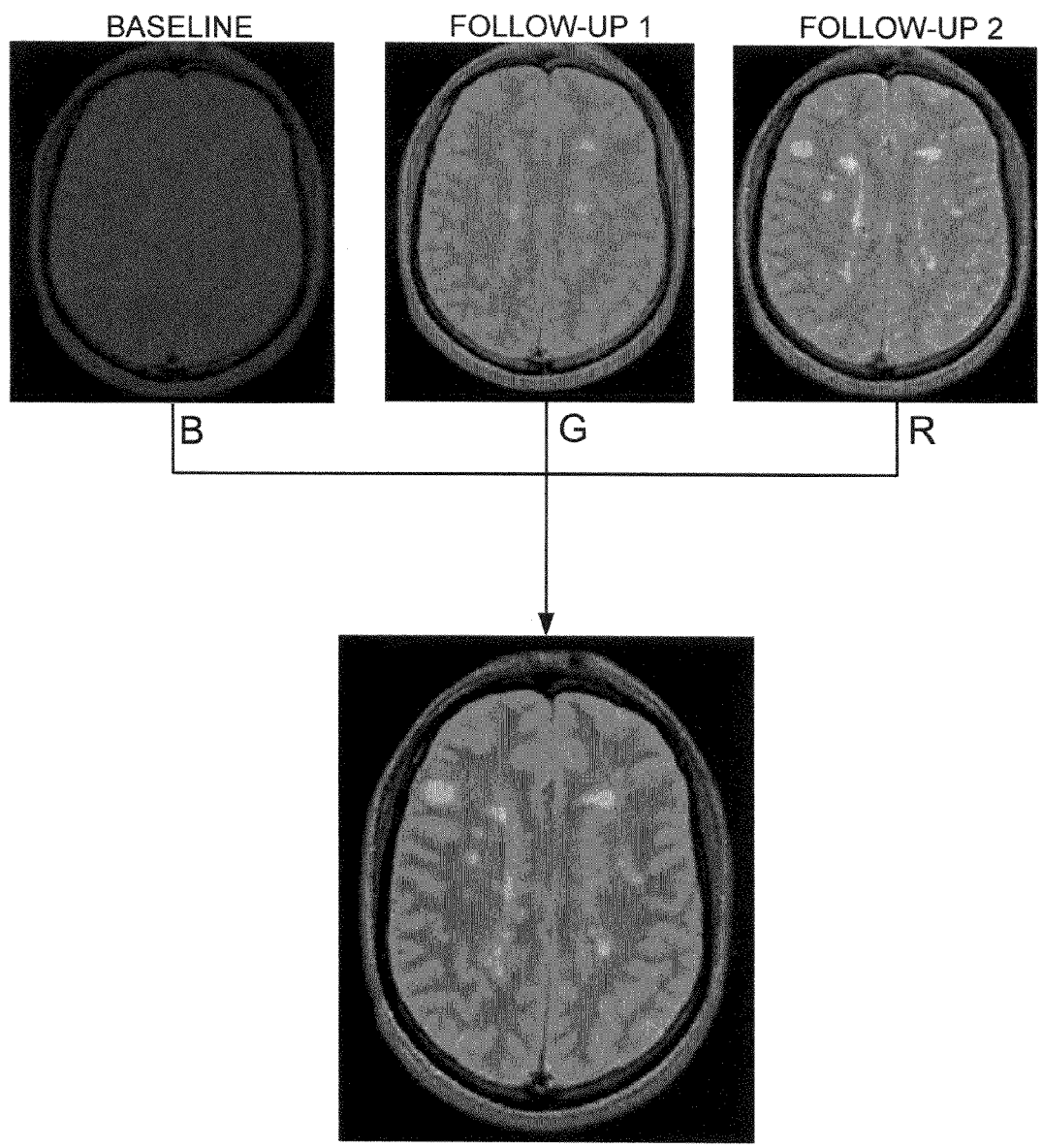
FIG. 4 shows three tinted MRI images and a color-composite image obtained by overlaying those tinted images.

The right-hand image on FIG. 4 shows a composite image 38 that results from applying the overlay process 36 to the three tinted images 34 on the left side of the figure. It is apparent from inspection of this composite image 38 that the morphology of certain areas of the brain has changed and that color has drawn particular attention to the existence of those changes. As discussed below, the particular hue and intensity of a changed portion of the image can be used to indicate when the change occurred.

In interpreting the color-composite image in FIG. 4, it is useful to recognize that the oldest, or baseline image is tinted blue, the most recent image is tinted red, and an image taken between these two images is tinted green. Assuming this particular sequence, recent changes will tend to be in warmer colors and less recent changes will tend to be in cooler colors.

The sequencing of colors (blue, green, red) can be altered to represent other imaging sequences (e.g. CT, US) and other morphological changes. This sequence is intuitive for images in which pathological changes are associated with local hyperintensities. Thus a very recent hyperintensity in image three will add more red to the mixed image and appear as a warmer color indicating recent pathology. A reversal of the order (red, green, blue) would be intuitive for images in which active changes result in hypointensity (i.e. image pixels becoming darker).

Figure 5:
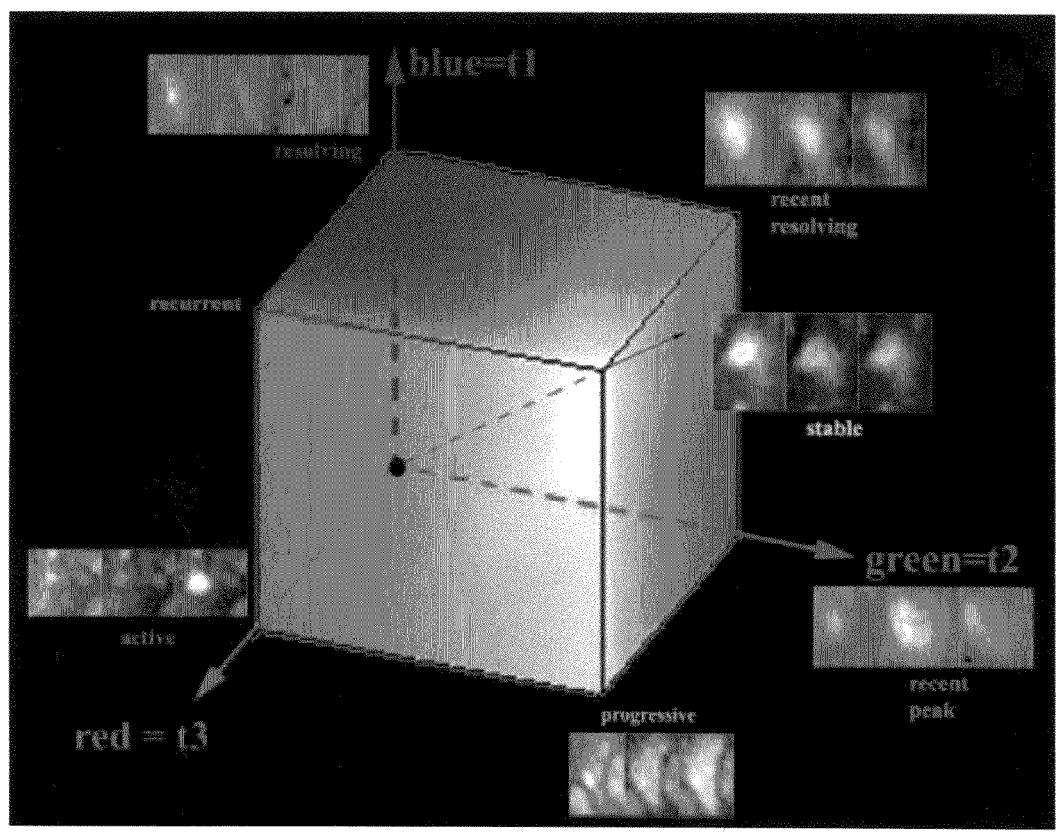
FIG. 5 is a color cube used for interpreting the color-composite image in FIG. 4.

FIG. 5 is a color cube suggesting how the colors in the color-composite image might be interpreted. For example, in the color-composite image in FIG. 4, active lesions, i.e. those that are of most recent origin, tend to be red. Recurrent lesions tend to be a combination of red and blue; resolving lesions, tend toward blue, with more recently resolving regions tending to a bluish green. Lesions that have peaked recently and have only just begun to resolve will tend toward green.

The color cube FIG. 5 provides a basis for creating a standardized interpretation system for comparison of serial images. If adopted, such an interpretation system would enhance the usefulness of the serial image analysis method disclosed herein by enabling exchange of images among sites while maintaining a common language for interpretation of those images.

In the foregoing example, a change in a serial image 18 corresponds to a change in structure. However, the change being observed can be a change in any parameter that is provided by, or inferred from, a particular image. For example, in the case of a PET scan, the change can be that of an uptake rate whose change can be observed.

An advantage of the foregoing implementation is that no data reduction has taken place. Because the original serial images 18 were tinted using primary colors, the original tinted images 34 can be recovered from the composite color image.

In an alternative embodiment, a sequence of four or more serial images 18 is compared by tinting each image with a different color. In this case, however, information will be lost because the number of images is greater than the dimensionality of the color space.

A suitable method for comparing sequences of more than four images is to process them three at a time. For example, given a sequence of images $I_1, I_2, \ldots I_1$, one can tint $I_1$ blue, I2 green and I3 red. Then, one can proceed by tinting I2 blue, tinting I3 green, and tinting I4 red, and so on.

The images being tinted need not be images taken at a particular instant. They can, for example, be images obtained by averaging or otherwise processing images that were taken at successive instants. For example, given the foregoing sequence of images, $I_1, I2 \ldots In$, one might define a "synthetic" image J1 by averaging the images $I_1 \ldots I10$. One could then tint J1 blue, and tint I11 green and I12 red to obtain a composite image. Or, one could define a second synthetic image, J2, by averaging together I11-I15, tint that image green, and tint I16 red and obtain another composite image.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What we claim as new, and secured by letters patent is:

1. A method for drawing attention to a change in serial radiological images, the method comprising:
    projecting each pixel of the serial radiological images onto a line in a color space;
    evaluating a vector sum of the resulting projections;
    generating a composite image from the vector sum;
    generating a composite image from the vector sum, the composite image having a colored region, the color of which is indicative of a change that occurred in that region of the image; and
    displaying the composite image, thereby drawing attention to a change in the serial images.

2. The method of claim 1, wherein projecting each of the images onto a line in a color space comprises selecting the lines on which the images are projected to include axes of an orthogonal basis for the color space.

3. The method of claim 2, further comprising selecting the axes to include a red axis, a green axis, and a blue axis.

4. The method of claim 3, wherein projecting each of the images onto a line comprises projecting the image acquired most recently onto the red axis, and projecting the image acquired earliest onto the blue axis.

5. The method of claim 1, further comprising normalizing the images relative to each other.

6. The method of claim 1, further comprising selecting the radiological images to be MRI images.

7. A computer-readable medium having encoded thereon software for drawing attention to a change in serial radiological images, the software comprising instructions for
    projecting each pixel of the serial radiological images onto a line in a color space;
    evaluating a vector sum of the resulting projections;
    generating a composite image from the vector sum, the composite image having a colored region, the color of which is indicative of a change that occurred in that region of the image; and
    displaying the composite image, thereby drawing attention to a change in the serial images.

8. A system for processing MRI images, the system comprising
    a data storage medium for storing serial MRI images,
    a processor configured to process the MRI images to draw attention to changed regions therein, and
    a computer-readable medium in data communication with the processor, the computer-readable medium having encoded thereon software for drawing attention to a change in serial radiological images, the software comprising instructions for
        projecting each pixel of the serial radiological images onto a line in a color space;
        evaluating a vector sum of the resulting projections;
        generating a composite image from the vector sum, the composite image having a colored region, the color of which is indicative of a change that occurred in that region of the image; and
        displaying the composite image, thereby drawing attention to a change in the serial images.

9. A method for drawing attention to a change occurring at a location in a human body, the location corresponding to a pixel in each of a plurality of serial radiological images, each such pixel having a value that defines a vector in a color space, the method comprising:
    for each of the serial radiological images,
        associating a line in the color space,
        projecting, onto the line, the vector corresponding to the location,
        whereby a set of projected vectors is generated, each of which corresponds to the location,
        the number of projected vectors thus generated being equal to the number of serial radiological images; and
    evaluating a vector sum of the projected vectors in the set of projected vectors corresponding to the location,
    whereby the vector sum of the projected vectors represents an extent of a change occurring at the location.

10. The method of claim 9, further comprising selecting the line associated with each of the serial radiological images such that the lines collectively define axes of an orthogonal basis for the color space.

11. The method of claim 10, further comprising selecting the axes to include a red axis, a green axis, and a blue axis.

12. The method of claim 11, further comprising
    projecting the serial radiological image acquired most recently onto the red axis, and
    projecting the serial radiological image acquired earliest onto the blue axis.

13. The method of claim 9, further comprising normalizing the serial radiological images relative to each other.

14. The method of claim 9, further comprising selecting the serial radiological images to be MRI images.

* * * * *